US011277271B2

(12) United States Patent
Abeln et al.

(10) Patent No.: US 11,277,271 B2
(45) Date of Patent: Mar. 15, 2022

(54) SRAM BASED PHYSICALLY UNCLONABLE FUNCTION AND METHOD FOR GENERATING A PUF RESPONSE

(71) Applicant: NXP USA, Inc., Austin, TX (US)

(72) Inventors: Glenn Charles Abeln, Buda, TX (US); Nihaar N. Mahatme, Austin, TX (US)

(73) Assignee: NXP USA, Inc., Austin, TX (US)

( * ) Notice: Subject to any disclaimer, the term of this patent is extended or adjusted under 35 U.S.C. 154(b) by 419 days.

(21) Appl. No.: 16/527,625

(22) Filed: Jul. 31, 2019

(65) Prior Publication Data

US 2021/0036872 A1 Feb. 4, 2021

(51) Int. Cl.

*G06F 11/30* (2006.01)
*H04L 9/32* (2006.01)
*G11C 11/412* (2006.01)
*G06F 1/00* (2006.01)

(52) U.S. Cl.

CPC .......... *H04L 9/3278* (2013.01); *G11C 11/412* (2013.01)

(58) Field of Classification Search

CPC ............................ H04L 9/3278; G11C 11/412

See application file for complete search history.

(56) References Cited

U.S. PATENT DOCUMENTS 7,688,669 B2 3/2010 McClure et al.
9,755,841 B2 * 9/2017 Chen .................... H04L 9/3278
9,947,391 B1 4/2018 Mahatme et al.
9,991,892 B2 6/2018 Wacquez et al.
10,078,494 B2 9/2018 Clark et al.
10,483,971 B1 * 11/2019 Lu ........................ G06F 30/398
2014/0126306 A1 * 5/2014 Otterstedt ................ G11C 7/06 365/189.07
2014/0325237 A1 * 10/2014 Van Der Leest ..... H04L 9/0866 713/189
2016/0093393 A1 * 3/2016 Park ....................... G11C 16/10 380/28
2017/0346644 A1 * 11/2017 Cambou ............... H04L 9/3278
2018/0157555 A1 * 6/2018 Lu ......................... G11C 29/50
2018/0345904 A1 * 12/2018 Moore ............... G07C 9/00174
2019/0068383 A1 * 2/2019 Wang ...................... G06F 21/73
2019/0312740 A1 * 10/2019 Cambou ................. G06F 21/44
2021/0036872 A1 * 2/2021 Abeln .................. G11C 11/417

OTHER PUBLICATIONS

Ruhrmair et al.: "PUFs at a Glance", 2014 Design, Automation and Test in Europe Conference and Exhibition, Mar. 24-28, 2014, IEEE, pp. 1-6.

* cited by examiner

*Primary Examiner* — Gary S Gracia

(57) ABSTRACT

A plurality of memory cells, in which each memory cell includes two corresponding supply terminal inputs, is powered up while applying a voltage differential between the corresponding supply terminal inputs for each of the plurality of memory cells. After powering up, the plurality of memory cells is read and a physically unclonable function (PUF) response is generated from data of the reading.

17 Claims, 5 Drawing Sheets

PROVIDE INPUT CHALLENGE, INCLUDING DIFFERENTIAL SOURCE BIAS SETTING 502
SECURITY MODULE ACTIVATED; PROCESSOR ENTERS WAIT STATE; I/Os DEACTIVATED DURING PUF EVALUATION TO PREVENT NOISE INTRUSION 504
SECURITY MODULE ACTIVATES PUF EVAL ENGINE & FORWARDS CHALLENGE WITH DESIRED DIFFERENTIAL SOURCE BIAS SETTING 506
APPLY THE DIFFERENTIAL SOURCE BIAS SETTING TO THE SRAM 508
POWER RESET THE SRAM 510
READ CELL VALUES TO GENERATE PUF RESPONSES 512
514 ANOTHER CHALLENGE NEEDED?
NO
518 PROCESS PUF RESPONSES BY SECURITY MODULE
YES
PROVIDE NEXT INPUT CHALLENGE, INCLUDING A NEXT DESIRED DIFFERENTIAL SOURCE BIAS SETTING 516

SRAM BASED PHYSICALLY UNCLONABLE FUNCTION AND METHOD FOR GENERATING A PUF RESPONSE

BACKGROUND

Field

This disclosure relates generally to electronic circuits and more specifically to a static random access memory (SRAM) based physically unclonable function (PUF) and method for generating a PUF response.

Related Art

A physically unclonable function (PUF) is a physical system that will ideally produce an unpredictable but repeatable response when a specific stimulus is input. An example PUF uses a static random access memory (SRAM). SRAM cells are bi-stable, meaning they only have two stable states. When powered up, the bi-stable SRAM cell will settle in one of the two stable states. Although a conventional SRAM is normally laid out to be symmetrical, the state it will be in when powered-up is unpredictable. Manufacturing variations, temperature, power supply, switching noise, device aging, and other factors may cause some of the cells of the PUF to power-up in different states at different times. Because of this randomness, no two integrated circuits are exactly alike and so the output of the PUF is difficult to predict, and therefore difficult to recreate. This makes the PUF useful for storing unique information about the IC. For example, the PUF may be used to generate a digital fingerprint or encryption/decryption key. A need exists, though, for implementing a more robust PUF based on start-up behaviors of an SRAM which makes it even harder to extract the unique information.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided a PUF implemented in a plurality of SRAM cells in an SRAM in which the natural state of the SRAM cells is modified prior to providing a PUF response. In one embodiment, a bias condition, which modifies the natural state of the SRAM, can be applied upon powering up the SRAM to generate a PUF response. Therefore, each challenge further includes a bias condition setting which is used to modify an SRAM's natural state. For example, in one embodiment, the bias condition setting is a differential source bias setting provided to the SRAM cells which results in a differential source bias voltage between two source lines of each SRAM cell. In this manner, each challenge may also indicate a corresponding differential source bias setting which can be selected from a plurality of differential source bias setting possibilities. In one embodiment, a plurality of challenges, each including a corresponding differential source bias setting, can be provided to the SRAM array to obtain corresponding PUF responses. In this embodiment, a power reset of the SRAM is performed between each challenge in order to power up the SRAM using its corresponding differential source bias setting prior to generating a corresponding PUF response. By using such differential source biases with each challenge, robustness of the generated PUF is increased by expanding the possible power up states of the SRAM, rather than just relying on the natural state of the SRAM, thus making it harder to extract unique device information.

Figure 1:
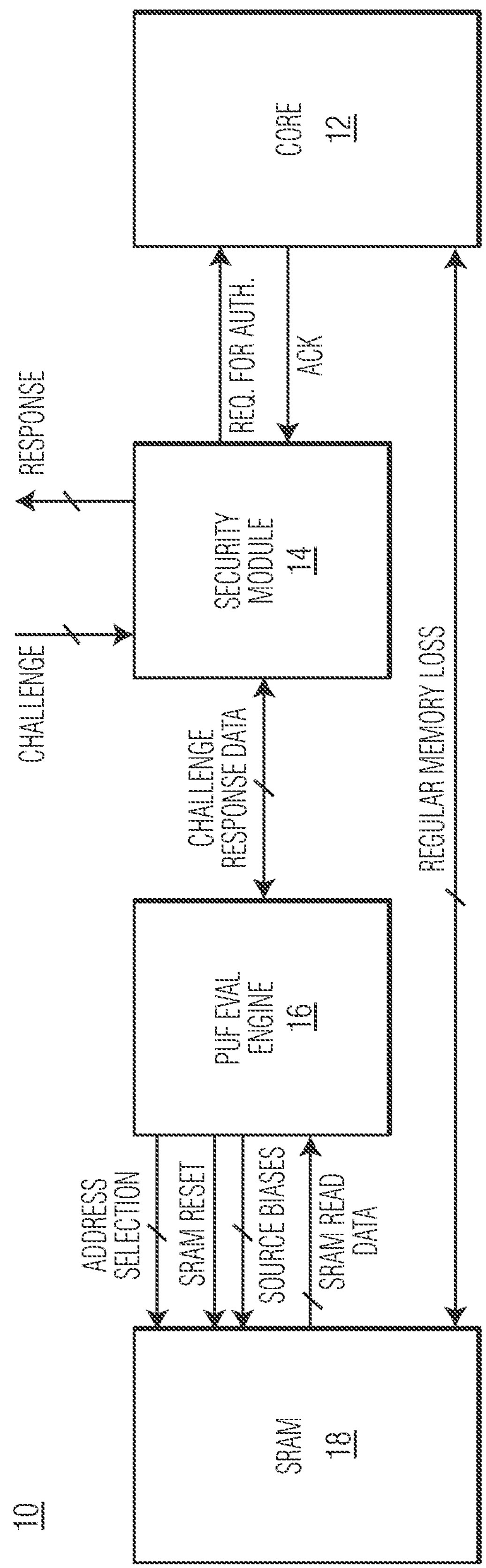
FIG. 1 illustrates, in block diagram form, a system including an SRAM in accordance with an embodiment of the present invention.

FIG. 1 illustrates a data processing system 10 in accordance with an embodiment of the present invention. Data processing system 10 includes processor core 12, security module 14, PUF evaluation engine 16 and SRAM 18. Processor core 12 can be any kind of processor core for executing instructions. Processor core 12 is bi-directionally connected to SRAM 18 for regular read and write operations. Processor core 12 is also connected to security module 14 to provide an acknowledge signal ACK when a request for authentication (REQ FOR AUTH) is requested by security module 14. Security module 14 provides the request for authentication in response to receiving a challenge signal from a requestor. When response data RESPONSE DATA is needed because a challenge labeled CHALLENGE is received from a requestor (which also includes a differential source bias setting), PUF evaluation engine 16 applies the differential source bias setting by way of source biases to SRAM 18. PUF evaluation engine 16 provides an SRAM reset signal to SRAM 18, and in response thereto, SRAM 18 is power reset. After the power reset, PUF evaluation engine 16 provides an address to SRAM 18, and in response, SRAM 18 provides SRAM read data back to PUF evaluation engine 16. PUF evaluation engine 16 evaluates the SRAM read data and generates a PUF response which provides a digital code. The digital code may be processed by security module 14 to, for example, generate a unique chip ID, encryption/decryption key, digital signature, or the like. Note that only the circuits used to generate the PUF response are illustrated. For the purposes of simplicity and clarity, some or all the circuits used for normal read and write operations of SRAM 18 are omitted.

Figure 2:
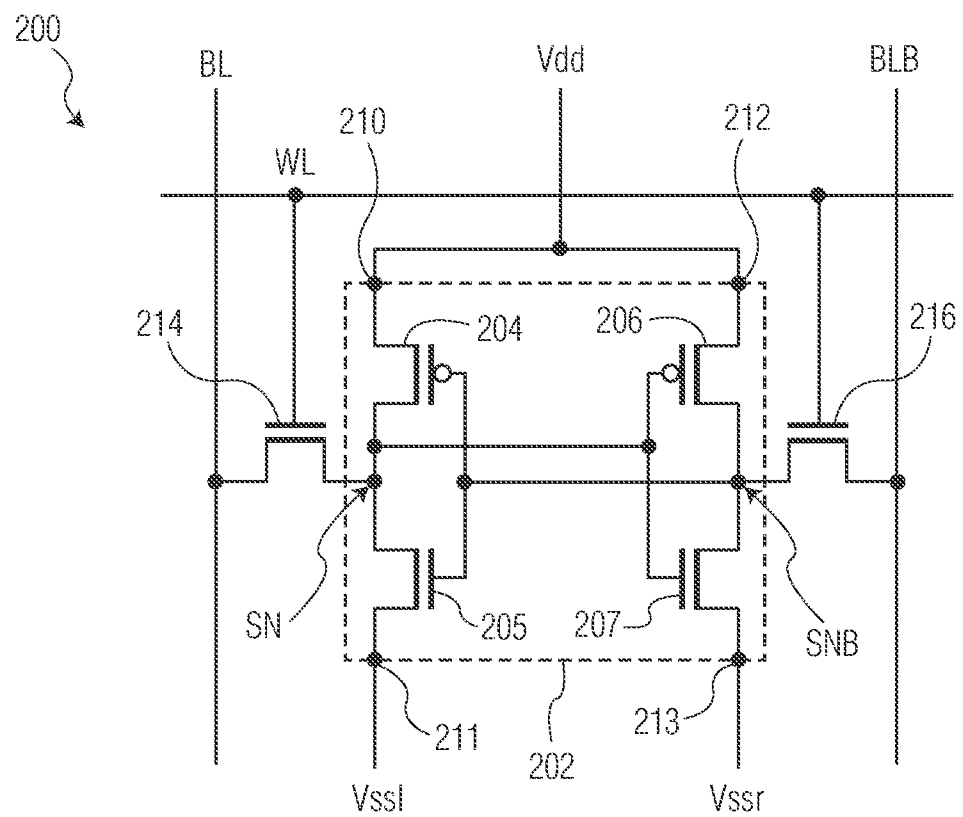
FIG. 2 illustrates, in schematic form, an SRAM cell of the SRAM of FIG. 1, in accordance with an embodiment of the present invention.

FIG. 2 illustrates, in schematic form, an SRAM cell 200 of SRAM 18 of FIG. 1, in accordance with an embodiment of the present invention. SRAM cell 200 is a 6T SRAM cell, which includes pass transistors 214 and 216, and transistors 204-207 which form cross-coupled inverters 202. Transistors 214, 216, 205, and 202 are n-type field effect transistors (NFETs) and transistors 204 and 206 are p-type field effect transistors (PFETs). BL refers to an example bit line of SRAM 18, BLB to the complement of BL, and WL to an example word line of SRAM 18. BL and BLB are referred to collectively as a bit line pair. Each SRAM cell (also referred to as a bit cell) is coupled to a corresponding bit line pair (BL/BLB) and WL. That is, SRAM array may include a plurality of rows (each corresponding to a word line) and a plurality of columns (each corresponding to a bit line pair), in which an SRAM cell is located at each intersection of a bit line pair and word line.

Referring to FIG. 2, a first current electrode of transistor 214 is coupled to BL, a control electrode of transistor 214 is coupled to WL, and a second current electrode of transistor 214 is coupled to a first storage node (SN). A first current electrode of transistor 216 is coupled to BLB, a control electrode of transistor 216 is coupled to WL, and a second current electrode of transistor 216 is coupled to a second storage node (SNB), corresponding to the complement of SN. Transistor 204 has a first current electrode coupled to a first voltage supply terminal, referred to as Vdd, a second current electrode coupled to SN, and a control electrode coupled to SNB. Transistor 205 has a first current electrode coupled to SN, a control electrode coupled to SNB, and a second current electrode coupled to a second voltage supply terminal, referred to as Vssl. Transistor 206 has a first current electrode coupled to Vdd, a second current electrode coupled to SNB, and a control electrode coupled to SN. Transistor 207 has a first current electrode coupled to SN, a control electrode coupled to SNB, and a second current electrode coupled to a third voltage supply terminal, referred to as Vssr. In the illustrated embodiment, Vssl is applied to the left source line of cell 200 and Vssr is applied to the right source line of cell 200.

Cross coupled inverters 202 include a first inverter and a second inverter, in which an output of the first inverter is coupled to an input of the second inverter, and an output of the second inverter is coupled to an input of the first inverter. The first inverter is formed by transistors 204 and 205 and is coupled between supply terminal inputs 210 and 211, in which supply terminal input 210 is coupled to a first voltage supply terminal (VDD) and supply terminal input 211 is coupled to a second voltage supply terminal (Vssl). The second inverter is formed by transistors 206 and 207 and is coupled between supply terminal inputs 212 and 213, in which supply terminal input 212 is coupled to Vdd and supply terminal input 213 is coupled to a third voltage supply terminal (Vssr). Therefore, note that, in the illustrated embodiment, supply terminal inputs 210 and 212 are referred to as high supply terminal inputs and terminal inputs 211 and 213 are referred to as low supply terminal inputs since Vdd is greater than each of Vssl and Vssr.

Operation of reading and writing an SRAM cell during normal operation is well known in the art, and therefore will not be described in further detail here. SRAM cell 200 is configured as an SRAM cell of a PUF array, in which SRAM cell provides a single bit of a PUF response upon power up. Therefore, SRAM 18, which includes SRAM cell 200, may be referred to as a PUF array. The entire data array of SRAM 18 may be the PUF array, or only a portion of SRAM 18 may be used as the PUF array, with the remaining portion may be used for normal reads and writes. As described above, when an SRAM cell is powered up, it will settle into one of two stable states (in which in a first state, SN=1 and SNB=0, and in a second state, SN=0 and SNB=1), based on, for example, transistor mismatches in the cell. The natural state of SRAM cell 200 is obtained by applying no differential source bias (Vssl=Vssr=0) upon power up. In this first scenario, upon power up, SRAM cell 200 will settle into a particular state. However, the natural state can be modified by applying a differential source bias upon power up, in which Vssl and Vssr are not equal. In this second scenario, upon power up, SRAM cell 200 will also settle into a particular state, but this particular state may be the same or different from the particular state in the first scenario, depending on the differential source bias.

Therefore, assuming a PUF array made of SRAM cells such as SRAM cell 200, the PUF array can be powered up in a natural state, with all source lines=0, to obtain a first PUF response (i.e. a first digital code), and then PUF array can be powered up a second time using a differential source bias, in which the voltages for Vssl in the PUF array are different from the voltages for Vssr in the PUF array, so as to obtain a second PUF response (i.e. a second digital code). In the first digital code, a first subset of SRAM cells will have settled into the first state, while in the second digital code, a second subset of SRAM cells will have settled into the first state. Due to the differential source bias, the first and second subsets are not generally equal. Therefore, using different differential source bias settings (setting Vssl and Vssr to different values, with varying degrees of difference between the two), SRAM 18 can be used to obtain a number of PUF responses, and not just a single PUF response corresponding to the natural state of the SRAM array.

Therefore, referring back to FIG. 2, with each challenge provided to security module 14 and forwarded to PUF evaluation engine 16, a differential source bias setting can also be provided such that PUF evaluation engine 16 can properly set the values of Vssl and Vssr for the PUF array upon power up. The differential source bias setting can be provided in any manner to indicate a voltage for Vssl and a different voltage for Vssr which can be globally applied to every SRAM cell in the PUF array. In an alternate embodiment, the PUF array in SRAM 18 can be separated into blocks in which a differential source bias setting can be applied to each block rather than being applied globally to the PUF array.

Figure 3:
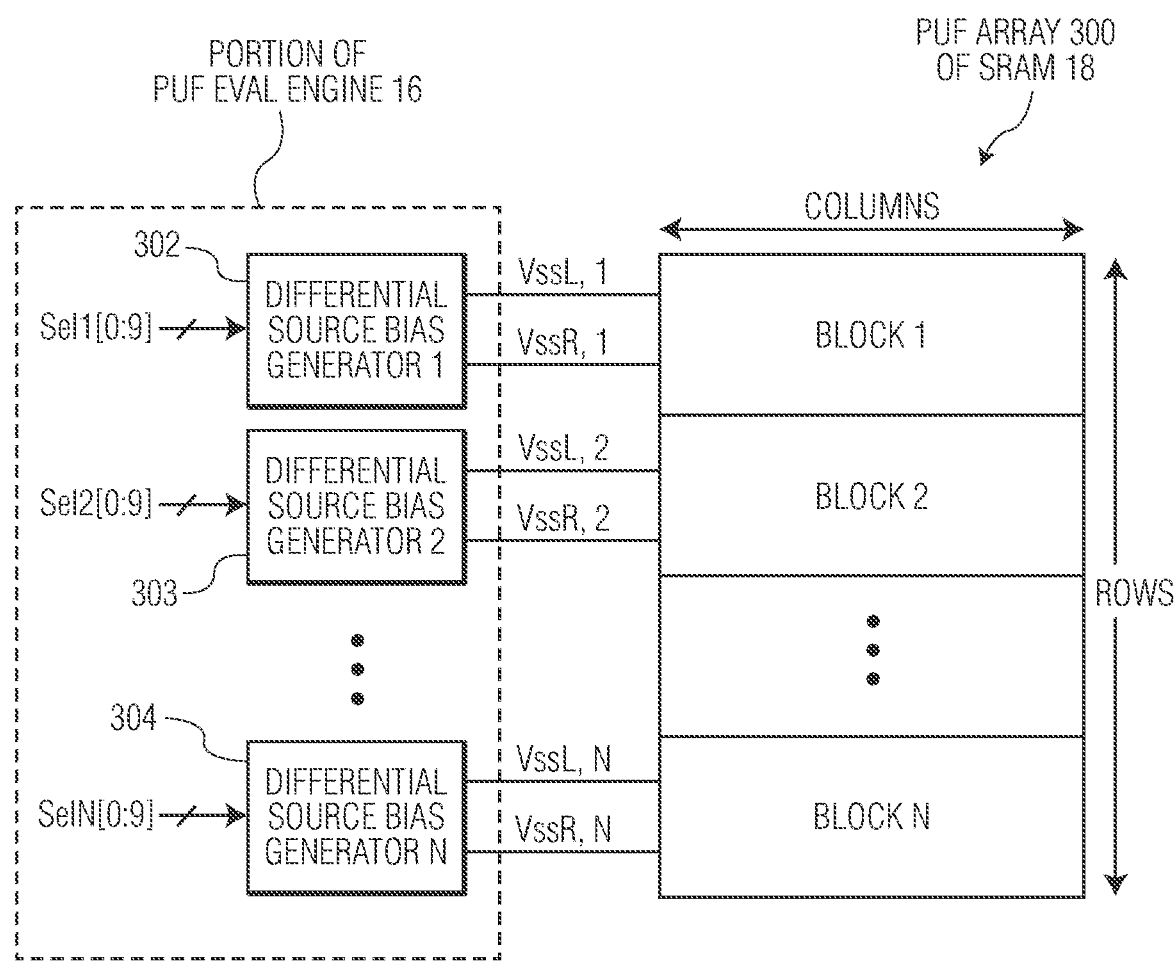
FIG. 3 illustrates, in block diagram form, a portion of a PUF evaluation engine and PUF array of FIG. 1, in accordance with an embodiment of the present invention.

FIG. 3 illustrates, in block diagram form, a portion of a PUF evaluation engine 16 and a PUF array 300 of SRAM 18, in accordance with an embodiment of the present invention. PUF array 300 can be all or a portion of the data array in SRAM 18. PUF array 300 is divided into N blocks, block 1-block N, in which each block receives a local differential source bias. That is, each block receives a corresponding Vssl and Vssr applied by PUF evaluation engine 16 based on a select signal for that block. For example, PUF evaluation engine 16 includes a differential source bias generator 1 302 which receives a differential source bias select signal, sel1, and in response, provides Vssl,1 and Vssr,1 to block 1 (in which the comma and "1" following Vssl and Vssr indicate block 1). Similarly, PUF evaluation engine 16 includes a differential source bias generator 2 303 which receives a differential source bias select signal, sel2, and in response, provides Vssl,2 and Vssr,2 to block 2. PUF evaluation engine 16 includes similar circuitry for each of blocks 1-N, such as a differential source bias generator N 304 which receives a differential source bias select signal, selN, and in response, provides Vssl,N and Vssr,N to block N.

Figure 4:
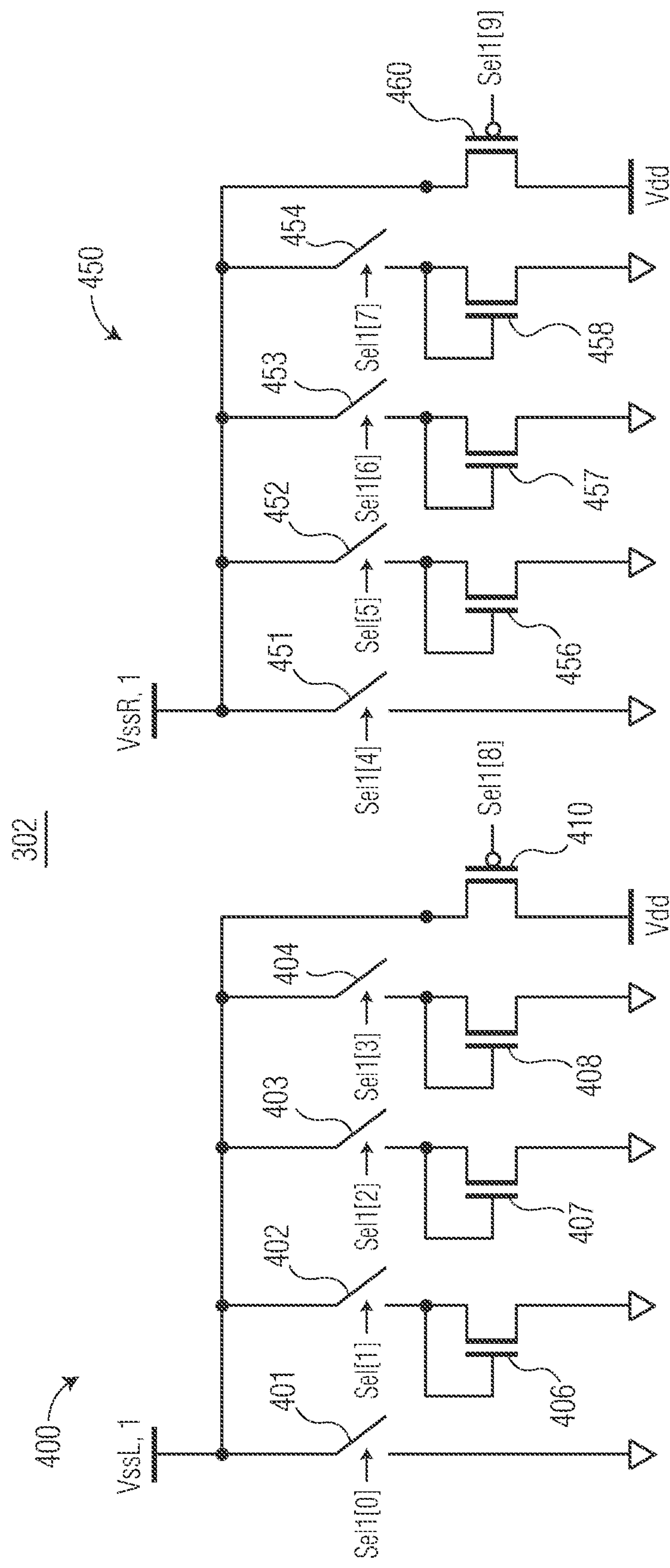
FIG. 4 illustrates, in schematic form, further detail of a differential source bias generator of FIG. 3, in accordance with an embodiment of the present invention.

In one embodiment, each of the select signals is a 10-bit signal, in which a first portion, e.g. 8 bits, is used to select a combination of Vssl and Vssr values. In this embodiment, the remaining portion, e.g. 2 bits, is used for a faster discharge of the PUF array. FIG. 4 illustrates, in schematic form, further detail of differential source bias generator 1 302 of FIG. 3, in accordance with an embodiment of the present invention. Note that the circuitry described in reference to differential source bias generator 1 302 can be used for each differential source bias generator of PUF evaluation engine 16. Differential source bias generator 1 302 includes a first circuit 400 to generate Vssl,1, and a second circuit 450 used to generate Vssr,1. Circuit 400 includes a switch 401 coupled between Vssl,1 and Vss (or ground), a switch 402 coupled between Vssl,1 and a transistor 406, a switch 403 coupled between Vssl,1 and a transistor 407, a switch 404 coupled between Vssl,1 and a transistor 408, and a transistor 410 coupled between Vssl,1 and Vdd. Transistors 406-408 are NFETs and transistor 410 is a PFET. The control inputs of each of switches 401-404 receive a corresponding bit of sel1, sel1[0]-sel1[3], and a control electrode of transistor 410 receives sel1[8]. When the control input of a switch is asserted, it is placed in a conductive state, and when not asserted (i.e. negated), it is placed in a non-conductive state. For example, when sel1[0] is asserted, Vssl,1 is coupled to ground, when sel1[1] is asserted a first current electrode and a control electrode of transistor 406 is coupled to Vssl,1, when sel1[2] is asserted a first current electrode and a control electrode of transistor 407 is coupled to Vssl,1, and when sel1[3] is asserted a first current electrode and a control electrode of transistor 408 is coupled to Vssl,1. A second current electrode of each of transistors 406-408 is coupled to ground.

Similarly, circuit 450 includes a switch 451 coupled between Vssr,1 and Vss, a switch 452 coupled between Vssr,1 and a transistor 456, a switch 453 coupled between Vssr,1 and a transistor 457, a switch 454 coupled between Vssr,1 and a transistor 458, and a transistor 460 coupled between Vssr,1 and Vdd. Transistors 456-458 are NFETs and transistor 460 is a PFET. The control inputs of each of switches 451-454 receive a corresponding bit of sel1, sel1 [4]-sel1[7], and a control electrode of transistor 460 receives sel1[9]. When the control input of a switch is asserted, it is placed in a conductive state. For example, when sel1[4] is asserted, Vssr,1 is coupled to ground, when sel1[5] is asserted a first current electrode and a control electrode of transistor 456 is coupled to Vssr,1, when sel1[6] is asserted a first current electrode and a control electrode of transistor 457 is coupled to Vssr,1, and when sel1[7] is asserted a first current electrode and a control electrode of transistor 458 is coupled to Vssr,1. A second current electrode of each of transistors 456-458 is coupled to ground.

Therefore, circuit 400 includes 4 branches which are selectable by bits 0-3 of sel1, and circuit 450 includes 4 branches which are selectable by bits 4-7 of sel1. Each branch provides increasing voltages to the corresponding source line. For example, in one embodiment, each of transistors 406-408 are increasing in size. Therefore, by selecting different voltages for Vssl and Vssr, a differential source bias voltage is applied to the left and right source lines of each SRAM cell in a particular block of PUF array 300. Similar circuitry can also be used to apply a global differential source bias. In alternate embodiments, each branch in circuits 400 and 450 can include a different number of transistors or other circuit elements to create different voltages for Vssl or Vssr when selected by a corresponding switch, such as switches 401-404 and 451-454. Also, note that in alternate embodiments, the select signal can be any number of bits, as needed, and may be provided in different formats, as needed. For example, in one embodiment, the select signal can be provided as a multi-bit signal which is decoded to determine which switch or switches to select for Vssl or Vssr.

In an alternate embodiment, a multiplexer (or other voltage selection circuit) can be used for each of circuits 400 and 450 in which multiple voltages for Vssl and Vssr, respectively, are provided as inputs to the multiplexers and an output of the multiplexers provides Vssl and Vssr, respectively. In this embodiment, the select signal would be provided to the control inputs of each multiplexer to select the appropriate input voltage for each of Vssl and Vssr.

Also, each circuit 400 and 450 includes a branch having a PFET coupled between Vssl or Vssr and Vdd. One bit of the select signal, such as sel1[8] and sel1[9], may be provided to turn on transistors 410 and 460, respectively. In one embodiment, these are turned on to aid in discharging SRAM 18 faster, such as upon a power reset. In the illustrated embodiment, each block has corresponding transistors to aid in discharge, such as transistors 410 and 460. Alternatively, all Vssl and Vssr nodes may globally be coupled to Vdd upon reset. In one embodiment, a multiplexer whose control input is coupled to receive the SRAM reset signal, can be used to couple the supply input terminals which receive Vdd (e.g. the source lines of the PFETs) to Vss instead, in response to an SRAM reset, to further aid in discharging SRAM 18. Alternatively, other circuitry may be used to help SRAM 18 discharge.

Figure 5:
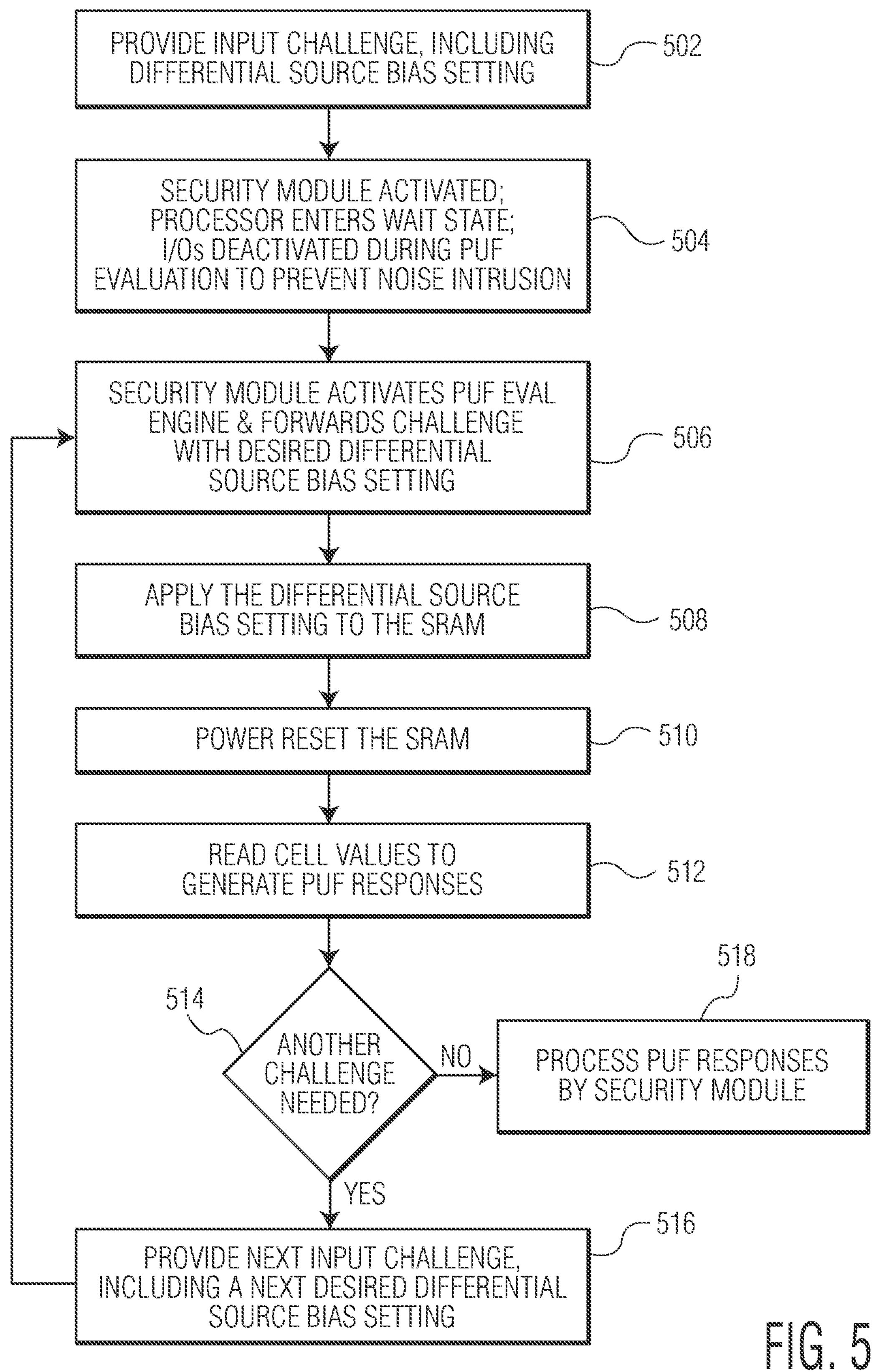
FIG. 5 illustrates, in flow diagram form, a method for generating a PUF response in the system of FIG. 1, in accordance with an embodiment of the present invention.

FIG. 5 illustrates, in flow diagram form, a method 500 for generating a PUF response in the system of FIG. 1, in accordance with an embodiment of the present invention. At block 502, an input challenge is provided to system 10, such as to security module 14, in which the input challenge includes a corresponding differential source bias setting. At block 504, security module 14 is activated and processor core 12 enters an inactive state, such as a wait state. Also, any input/outputs (I/Os) are deactivated during the PUF evaluation process to prevent noise intrusion. At block 506, security module 14 activates PUF evaluation engine 16 and then forwards the challenge, including the desired differential source bias setting, to PUF evaluation engine 16. At step 508, PUF evaluation engine 16 applies the differential source bias setting to SRAM 18. This may be done per block if the PUF array of SRAM 18 is separated into blocks as in FIG. 3, or one Vssr and Vssl combination may be provided globally to SRAM 18. In the case that the differential source bias settings are applied per block, note that each block may have a different corresponding differential source bias setting, which may each be provided as part of the input challenge.

At block 510, a power reset of SRAM 18 is performed. As described above, prior to the power reset, circuitry may be used to help discharge SRAM 18 prior to powering SRAM 18 back up. For example, discharge transistors, such as transistors 410 and 460, for each block may be turned on for a period of time, or the PFET source lines can be set to Vss, or both. Note that, at block 510, SRAM 18 is powered up with the applied differential source bias setting which alters the initial (i.e. start-up) state of the SRAM. At block 512, after SRAM 18 is powered up, PUF evaluation engine 16 reads cell values of SRAM 18 to generate PUF responses. For example, PUF evaluation engine 16 provides read addresses to SRAM 18 to evaluate selected SRAM cells that comprise the PUF, and, in response, SRAM 18 provides the SRAM read currents of the selected cells to PUF evaluation engine 16. PUF evaluation engine 16, based on the SRAM read currents, evaluates the state (i.e. read data) of each selected SRAM cell in the PUF array to form the PUF response to the challenge. This PUF response may be in the form of a digital code which may be stored in storage circuitry of PUF evaluation engine 16 or elsewhere within system 10.

At decision diamond 514, it is determined whether there are further challenges, such as challenges using the natural state of the PUF array or using different differential source bias settings. If so, the next input challenge is provided to security module 14 (at block 516), including a next desired differential source bias setting corresponding to the next input challenge, and method 500 returns to block 506 to obtain a second PUF response which may be in the form of a digital code which may also be stored in the storage circuitry of PUF evaluation engine 16 (or elsewhere within system 10). Note that this digital code corresponds to the state (i.e. read data) of each selected SRAM cell in the PUF array, in which the same cells that were previously read can be read again, but after having been powered up using a different differential source bias setting. In this manner, multiple PUF challenge-response pairs may be generated for the same read address in a PUF array.

At decision diamond 514, if no other challenges are needed, the one or more PUF responses (e.g. digital codes) are provided to security module 14 (at block 518) which may further process the responses, as needed, and forward the PUF responses, or processed PUF responses, to the requestor. Processor core 12 resumes normal processing. In one embodiment, SRAM 18 is available for normal use in which processor core 12 may access SRAM 18 for regular read and write access. Also, processor core 12 may communicate with security module 14 in response to, for example, requests for authentication.

Note that with method 500, multiple challenges corresponding to multiple differential source bias settings can be provided to generate corresponding PUF responses. In one embodiment, in which the PUF array is divided into different blocks, method 500 is performed on the blocks simultaneously, with each block uses its corresponding differential source bias setting. Alternatively, method 500 can be performed on subsets of the blocks, in series.

The descriptions provided above with respect to FIGS. 2, 3, 4, and 5, refer to applying selected differential source bias settings to the left and right low supply terminals of the cross-coupled inverters (such as terminals 211 and 213, corresponding to the NFET source lines of the cross-coupled inverters). However, in alternate embodiments, the left and right high supply terminals (such as terminals 210 and 212) may instead receive a different source bias voltage. In this alternate embodiment, Vssl=Vssr=Vss (or ground), and instead, different voltages would be applied to terminals 210 and 212, corresponding to the PFET source lines of the cross-coupled inverters, which could be referred to as Vddl and Vddr, respectively. The same descriptions above with respect to generating Vssl and Vssr would also apply to generating Vddl and Vddr. Whether the differential source bias setting is provided for the NFET source lines or the PFET source lines of the cross-coupled inverters, the bias condition would result in modifying an SRAM cell's natural state upon power up. Note also that the portion of PUF evaluation engine 16 which provides the differential source bias voltages may be referred to as supply terminal bias circuitry, in which the supply terminal bias circuitry may also include any circuitry (such as, for example, transistors 410 and 460) which apply bias voltages to aid in discharging SRAM 18.

Therefore, by now it can be understood how multiple challenges, each with a corresponding differential source bias setting, can be provided to an SRAM based PUF array in order to generate multiple PUF responses. Each corresponding differential source bias setting for the SRAM based PUF array modifies the initial state of the SRAM cells in the PUF array upon power up, allowing for different PUF responses to be generated from the same read address of the PUF array. In this manner, the SRAM, such as SRAM 18, is capable of providing a stronger PUF function as the PUF array in SRAM 18 is able to produce multiple power up values by using different differential source bias settings.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Below are described embodiments of the present invention.

In one embodiment, a method includes powering up a plurality of memory cells each including two corresponding supply terminal inputs while applying a voltage differential between the corresponding supply terminal inputs for each of the plurality of memory cells; and after powering up, reading the plurality of memory cells and generating a physically unclonable function (PUF) response from data of the reading. In one aspect of this embodiment, the method further includes powering up for a second time, the plurality of memory cells while applying a second voltage differential between the corresponding supply terminal inputs for each of the plurality of memory cells, the second voltage differential is different from the first voltage differential; and after powering up for a second time, reading for a second time the plurality of memory cells and generating a second PUF response from data of the reading for a second time. In another aspect, the method further includes powering up a second plurality of memory cells each including two corresponding supply terminal inputs while applying a second voltage differential between the corresponding supply terminal inputs for each of the second plurality of memory cells, wherein the second voltage differential is different from the first voltage differential, and the powering up the plurality of memory cells is performed concurrently with the powering up the second plurality of memory cells; and after powering up, reading the second plurality of memory cells, wherein the generating the PUF response includes generating the PUF response from data of the reading of the second plurality. In a further aspect, the first plurality of memory cells and the second plurality of memory cells are located in a same memory array of memory cells. In another further aspect, the first plurality of memory cells are located in a first set of at least one row of a memory array and the second plurality of memory cells are located in a second set of at least one row of the memory array. In another aspect of this embodiment, the method further includes after the powering up, powering up a second plurality of memory cells each including two corresponding supply terminal inputs while applying a second voltage differential between the corresponding supply terminal inputs for each of the second plurality of memory cells, wherein the second voltage differential is different from the first voltage differential; and after powering up the second plurality, reading the second plurality of memory cells and generating a second PUF response from data of the reading of the second plurality. In a further aspect, the first plurality of memory cells and the second plurality of memory cells are located in a same memory array of memory cells. In another further aspect, the first plurality of memory cells are located in a first set of at least one row of a memory array and the second plurality of memory cells are located in a second set of at least one row of the memory array. In yet another aspect of this embodiment, each memory cell of the plurality of memory cells includes two cross coupled inverters, wherein the corresponding supply terminal inputs of the memory cells are characterized as supply terminal inputs of the inverters. In a further aspect, the corresponding supply terminal inputs of the memory cells are characterized as NFET supply terminal inputs of the inverters. In another aspect, the powering up the memory cells is performed at a startup of the memory. In another aspect, the method further includes prior to powering up the plurality of memory cells, resetting the plurality of memory cells. In a further aspect, resetting the plurality of memory cells includes applying a same voltage to the corresponding supply terminal inputs of the memory cells and to a third supply terminal input of each of the memory cell where each of the corresponding supply terminal inputs are characterized as one of a low supply terminal input or a high supply terminal inputs of the memory cell and the third supply terminal input is characterized as the other of a low supply terminal input or a high supply terminal input. In another aspect, after the generating, processing the PUF response by a security module operably coupled to the memory.

In another aspect, a memory includes a plurality of memory cells with each memory cell including a pair of cross coupled inverters, a first storage node, and a second storage node, wherein a first inverter of the pair of cross coupled inverters including an input couple to the first storage node and an output coupled to the second storage node, a second invertor of the cross coupled inverters including an input coupled to the second storage node and an output coupled to the first storage node, each inverter of the cross coupled inverters of each memory cell including a high supply terminal and a low supply terminal. The memory also includes supply terminal bias circuitry for supplying voltages to the high supply terminals and low supply terminals of each inverter of each memory cell, wherein the supply terminal bias circuitry is configurable to apply a supply voltage differential to at least one of the high supply terminals of the cross coupled inverters of each memory cell or the low supply terminals of the cross coupled inverters of each memory cell; and a physically unclonable function (PUF) controller, the supply terminal bias circuitry operably coupled to the PUF controller, the PUF controller receiving data read from the plurality of memory cells after the plurality of memory cells is powered up while applying a supply voltage differential to at least one of the high supply terminals of the cross coupled inverters of each memory cell or the low supply terminals of the cross coupled inverters of each memory cell. In one aspect of this another embodiment, the PUF controller forms a physically unclonable function (PUF) response from the data read from the plurality of memory cells. In another aspect, the supply terminal bias circuitry includes a voltage selection circuit including an output coupled to a supply terminal of an inverter of the cross coupled inverters for each memory cell of the plurality of memory cells, the voltage selection circuit including a plurality of inputs with each input coupled to receive a different voltage. In yet another aspect, the supply terminal bias circuitry is configurable to provide a same voltage to the high supply terminal and the low supply terminal of each inverter of the cross coupled inverters of each memory cell of the plurality of memory cells to reset the memory cells. In yet another aspect, the memory further includes a second plurality of memory cells with each memory cell including a pair of cross coupled inverters, a first storage node, and a second storage node, wherein a first inverter of the pair of cross coupled inverters including an input coupled to the first storage node and an output coupled to the second storage node, a second invertor of the cross coupled inverters including an input coupled to the second storage node and an output coupled to the first storage node, each inverter of the cross coupled inverters of each memory cell including a high supply terminal and a low supply terminal; wherein the supply terminal bias circuitry supplies voltages to the high supply terminals and low supply terminals of each inverter of each memory cell of the second plurality of memory cells, wherein the supply terminal bias circuitry is configurable to apply a supply voltage differential to at least one of the high supply terminals of each memory cell or the low supply terminals of each memory cell of the second plurality of memory cells, wherein the supply terminal bias circuitry is capable of supplying a different voltage differential to the plurality of memory cells than the supply voltage differential supplied to the second plurality of memory cells. In a further aspect, the plurality of memory cells and the second plurality of memory cells are in a memory array.

What is claimed is:

1. A method comprising:

powering up a plurality of memory cells each including two corresponding supply terminal inputs while applying a voltage differential between the corresponding supply terminal inputs for each of the plurality of memory cells;

powering up a second plurality of memory cells each including two corresponding supply terminal inputs while applying a second voltage differential between the corresponding supply terminal inputs for each of the second plurality of memory cells, wherein the second voltage differential is different from the first voltage differential, and the powering up the plurality of memory cells is performed concurrently with the powering up the second plurality of memory cells;

after powering up, reading the plurality of memory cells and generating to generate a physically unclonable function (PUF) response from data of the reading of the plurality of memory cells, and reading the second plurality of memory cells to generate a second PUF response from data of the reading of the second plurality of memory cells, wherein each PUF response provides a digital code that is selectively processed by a security module and provided to a requestor for authenticating requests.

2. The method of claim 1 further comprising:

powering up for a second time, the plurality of memory cells while applying a third second voltage differential between the corresponding supply terminal inputs for each of the plurality of memory cells, the second third voltage differential is different from the first voltage differential;

after powering up for a second time, reading for a second time the plurality of memory cells and generating a second third PUF response from data of the reading for a second time.

3. The method of claim 1 wherein the first plurality of memory cells and the second plurality of memory cells are located in a same memory array of memory cells.

4. The method of claim 1 wherein the first plurality of memory cells are located in a first set of at least one row of a memory array and the second plurality of memory cells are located in a second set of at least one row of the memory array.

5. The method of claim 1 further comprising:

after the powering up, powering up a second third plurality of memory cells each including two corresponding supply terminal inputs while applying a second third voltage differential between the corresponding supply terminal inputs for each of the second plurality of memory cells, wherein the second third voltage differential is different from the first voltage differential;

after powering up the second third plurality, reading the second third plurality of memory cells and generating a second third PUF response from data of the reading of the second third plurality.

6. The method of claim 5 wherein the first plurality of memory cells and the second third plurality of memory cells are located in a same memory array of memory cells.

7. The method of claim 5 wherein the first plurality of memory cells are located in a first set of at least one row of a memory array and the second third plurality of memory cells are located in a second set of at least one row of the memory array.

8. The method of claim 1 wherein each memory cell of the plurality of memory cells includes two cross coupled inverters, wherein the corresponding supply terminal inputs of the memory cells are characterized as supply terminal inputs of the inverters.

9. The method of claim 8 wherein the corresponding supply terminal inputs of the memory cells are characterized as NFET supply terminal inputs of the inverters.

10. The method of claim 1 wherein the powering up the memory cells is performed at a startup of the memory.

11. The method of claim 1 further comprising:

prior to powering up the plurality of memory cells, resetting the plurality of memory cells.

12. The method claim 11 wherein resetting the plurality of memory cells includes applying a same voltage to the corresponding supply terminal inputs of the memory cells and to a third supply terminal input of each of the memory cell where each of the corresponding supply terminal inputs are characterized as one of a low supply terminal input or a high supply terminal inputs of the memory cell and the third supply terminal input is characterized as the other of a low supply terminal input or a high supply terminal input.

13. The method of claim 1 wherein after the generating, processing the PUF response by a security module operably coupled to the memory.

14. A memory comprising:

a plurality of memory cells and a second plurality of memory cells, with each memory cell including a pair of cross coupled inverters, a first storage node, and a second storage node, wherein a first inverter of the pair of cross coupled inverters including an input couple to the first storage node and an output coupled to the second storage node, a second invertor of the cross coupled inverters including an input coupled to the second storage node and an output coupled to the first storage node, each inverter of the cross coupled inverters of each memory cell including a high supply terminal and a low supply terminal;

supply terminal bias circuitry for supplying voltages to the high supply terminals and low supply terminals of each inverter of each memory cell of the plurality of memory cells and of the second plurality of memory cells, wherein the supply terminal bias circuitry is configurable to apply a supply voltage differential to at least one of the high supply terminals of the cross coupled inverters of each memory cell or the low supply terminals of the cross coupled inverters of each memory cell, wherein the supply terminal bias circuitry is capable of supplying a different voltage differential to the plurality of memory cells than the supply voltage differential supplied to the second plurality of memory cells;

a physically unclonable function (PUF) controller, the supply terminal bias circuitry operably coupled to the PUF controller, the PUF controller receiving data read from the plurality of memory cells and from the second plurality of memory cells, after the plurality of memory cells and the second plurality of memory cells are is powered up while applying a first supply voltage differential to at least one of the high supply terminals of the cross coupled inverters of each memory cell or the low supply terminals of the cross coupled inverters of each memory cell in the plurality of memory cells and applying a second supply voltage differential, different from the first supply voltage differential, to at least one of the high supply terminals of the cross coupled inverters of each memory cell or the low supply terminals of the cross coupled inverters of each memory cell in the second plurality of memory cells, wherein the PUF controller forms a first physically unclonable function (PUF) response from the data read from the plurality of memory cells and a second PUF response from the read data from the second plurality of memory cells; and a security module to selectively process first and second PUF responses and provide them to a requestor for authenticating requests.

15. The memory of claim 14 wherein the supply terminal bias circuitry includes a voltage selection circuit including an output coupled to a supply terminal of an inverter of the cross coupled inverters for each memory cell of the plurality of memory cells, the voltage selection circuit including a plurality of inputs with each input coupled to receive a different voltage.

16. The memory of claim 14 wherein the supply terminal bias circuitry is configurable to provide a same voltage to the high supply terminal and the low supply terminal of each inverter of the cross coupled inverters of each memory cell of the plurality of memory cells to reset the memory cells.

17. The memory of claim 14 wherein the plurality of memory cells and the second plurality of memory cells are in a memory array.

* * * * *